United States Patent [19]

Benadi'

[11] 4,395,217

[45] Jul. 26, 1983

[54] ADAPTOR FOR EXTRUDING A PLURALITY OF STREAMS OF SYNTHETIC THERMOPLASTIC FOAM SIMULTANEOUSLY FROM A SINGLE EXTRUDER

[75] Inventor: Alberto Benadi', Turin, Italy

[73] Assignee: Lavorzaione Materie Plastiche L.M.P. S.p.A., Turin, Italy

[21] Appl. No.: 329,472

[22] Filed: Dec. 10, 1981

[30] Foreign Application Priority Data

Dec. 19, 1980 [IT] Italy ................................ 68950 A/80

[51] Int. Cl.³ .......................... B29D 27/00; B29F 3/04
[52] U.S. Cl. .................................. 425/382 R; 264/53; 425/378 R; 425/464; 425/817 C
[58] Field of Search ................ 425/382 R, 378 S, 464, 425/131.5, 463, 378 R, 817 C; 264/53

[56] References Cited

U.S. PATENT DOCUMENTS

| | | | |
|---|---|---|---|
| 3,038,202 | 6/1962 | Harkenrider | 425/464 |
| 3,416,190 | 12/1968 | Mehnert | 425/382 R X |
| 3,702,226 | 11/1972 | Kim et al. | 425/382 R X |
| 3,901,636 | 8/1975 | Zink et al. | 425/378 R |
| 4,076,477 | 2/1978 | Hacke | 425/464 X |
| 4,276,250 | 6/1981 | Satchell et al. | 425/463 X |

Primary Examiner—Philip E. Anderson
Attorney, Agent, or Firm—Sughrue, Mion, Zinn, Macpeak and Seas

[57] ABSTRACT

The adaptor, which can be applied to the delivery end of the extruder barrel, comprises a plurality of ducts for feeding corresponding extrusion heads, radiating from a common manifold chamber and each provided with a butterfly valve for the mutual adjustment of the flows of thermoplastic material in the respective ducts. Preferably the ducts with their respective valves are identical to each other and the valves are adjusted to give extruded products which are identical to each other.

3 Claims, 7 Drawing Figures

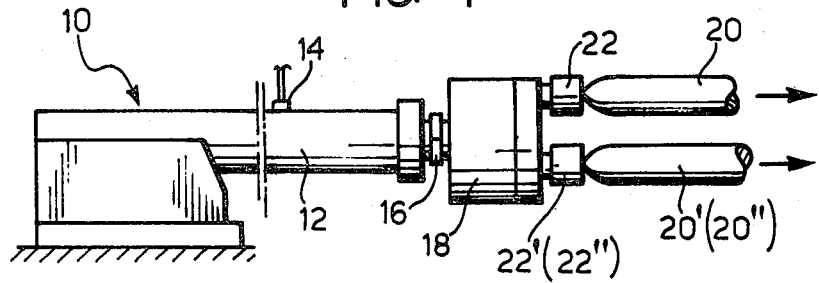
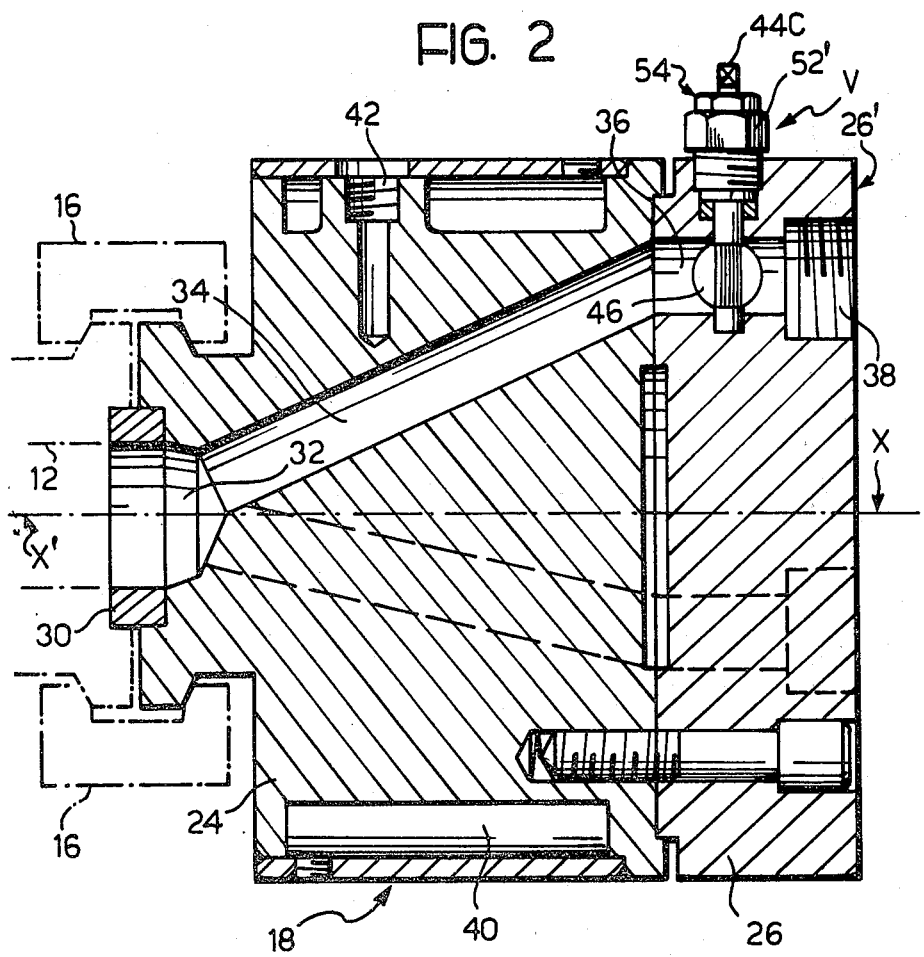

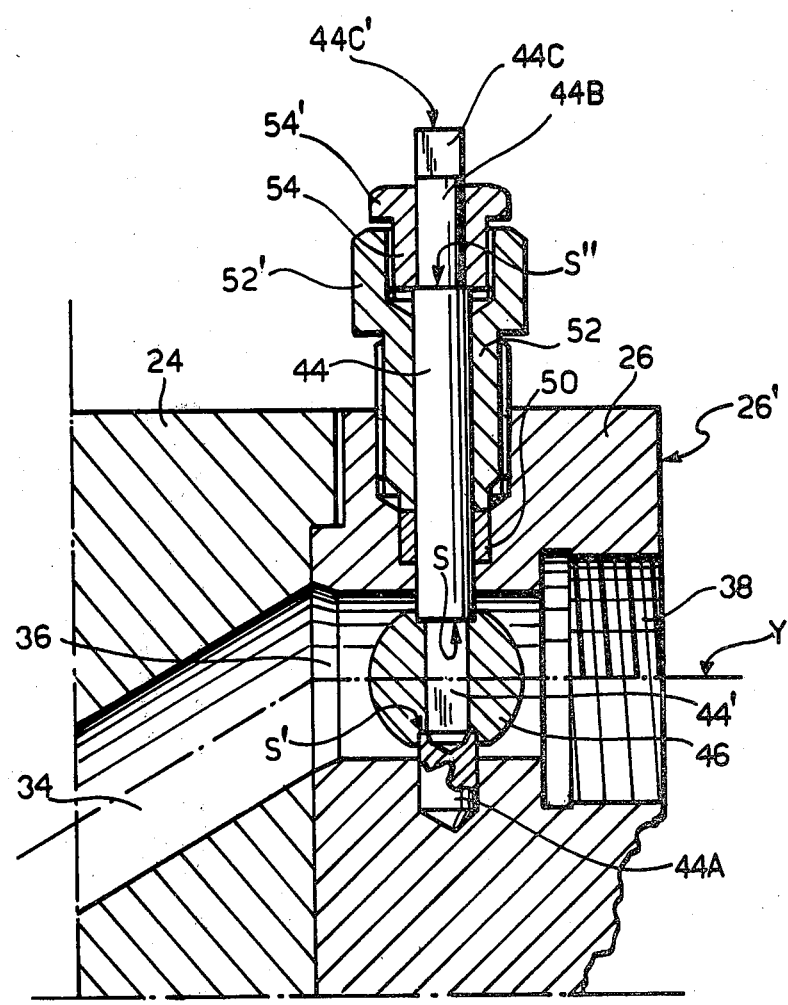

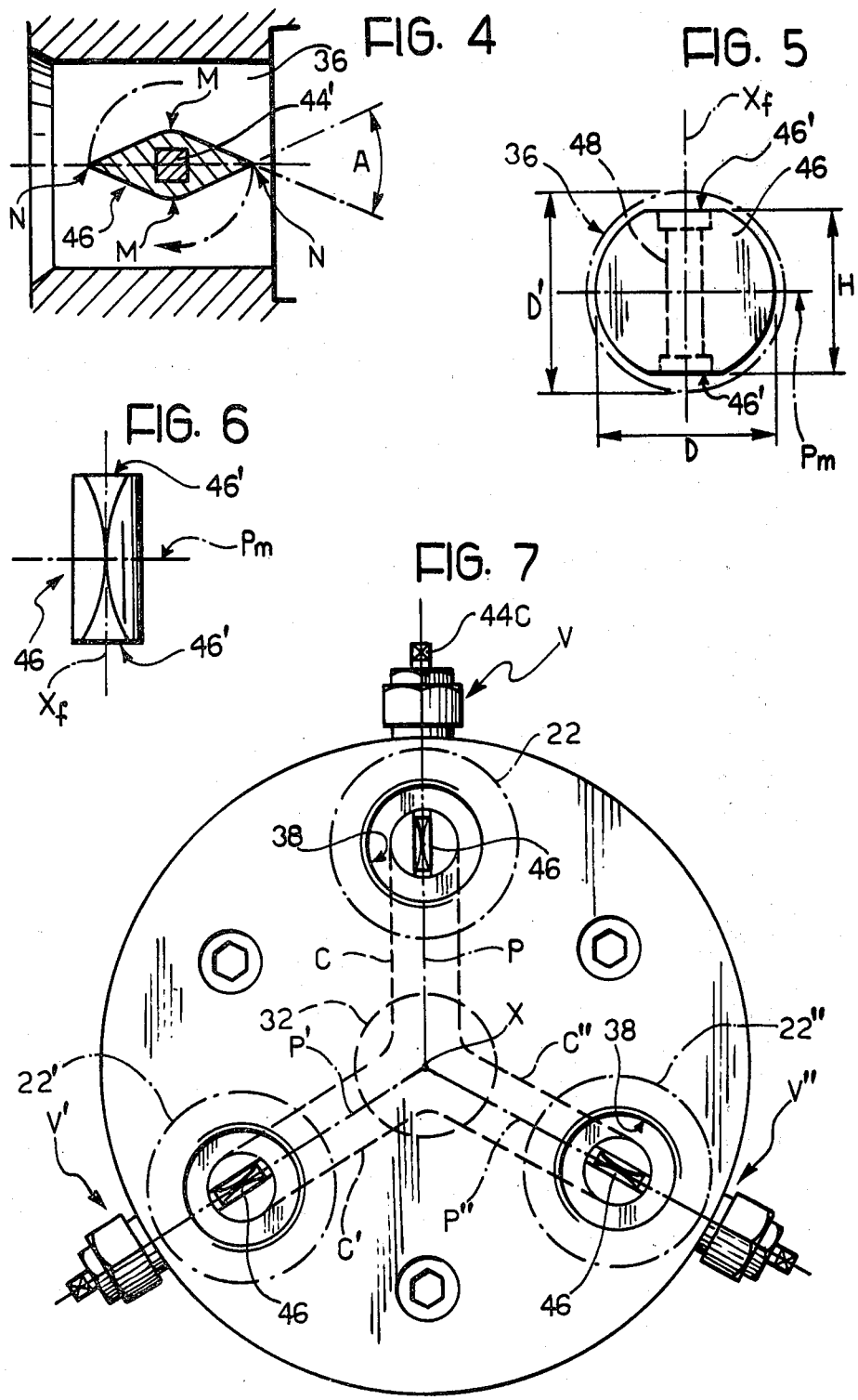

ADAPTOR FOR EXTRUDING A PLURALITY OF STREAMS OF SYNTHETIC THERMOPLASTIC FOAM SIMULTANEOUSLY FROM A SINGLE EXTRUDER

The present invention relates to an adaptor for extruding a plurality of streams of synthetic thermoplastic foam (for example of polystyrene, polyethylene, or polypropylene) simultaneously from a single extruder.

The term "stream" is used here in the generic sense to mean profiled sections and tubes of any cross-sectional form. The most typical streams to which the present invention relates are thermo-insulating tubes of synthetic foam used for lagging pipes for hot or cold fluids.

For most applications, thermo-insulating tubes of synthetic foam have moderate diameters and are made by small-capacity extruders (for example 20–40 kg/h of thermoplastic material worked). In order to increase the production, several extruders working simultaneously would be necessary. On the other hand, larger-sized thermo-insulating tubes are made by extruders of suitable capacity, for example 120–200 kg/h. There would be a practical advantage in using a high-capacity extruder for extruding simultaneously a plurality of the tubes (or streams generally) which are usually manufactured by small extruders, and particularly a plurality of tubes or streams which are identical to each other.

The idea of extruding several streams of plastics, or other material, simultaneously from a single extruder is not new. In principle this involves simply the subdivision of the main flow of material leaving the extruder barrel into several partial flows directed towards respective extrusion nozzles. However, things are complicated enormously when an attempt is made to apply this idea to the extrusion of thermoplastic foam because of the presence of the volatile expansion agent, generally a "FREON" (R.T.M.) or, for example, n-pentane, dissolved under pressure in the main flow of the thermoplastic mass provided by the extruder. In particular the difficulties increase when, as is desirable, the density of the extruded streams must be very low, of the order of 0.05 g/cm$^3$, and identical in all the streams. Indeed, in this case, even small pressure differences between one partial flow and another produce partial vaporisations of the expansion agent, with consequent variations in temperature, where by the extruded foams have densities which differ from each other due to their different degrees of expansion. Foam tubes which are extruded in this manner are not identical to each other in that they have different diameters due to their different degrees of expansion. Clearly, even the extrusion rates (expressed in linear meters per minute) of the individual tubes are different from each other such that a separate take-off device is needed for each extruded tube. In brief, the problem which is posed is that of being able to adapt the flow rate of any one of the partial flows with respect to the other partial flows by control means which avoid creating unacceptable local variations of pressure (for example due to turbulence) in the control zone. A subordinate problem is that of making use of simple and reliable control means.

The invention therefore has as its subject an adaptor for extruding a plurality of streams of synthetic thermoplastics foam simultaneously from a single extruder, comprising: a body having at one end means for attaching it to the barrel of the extruder in axial alignment therewith; a manifold chamber formed frontally the said one end to receive the thermoplastic mass from the said barrel; a plurality of ducts formed in the said body, radiating from the said manifold chamber and opening on the opposite end of the body, each of the said ducts terminating with attachment means for a respective extrusion head; a butterfly valve in each of the said ducts; and means for locking each of the valves individually in a desired angular position.

According to a particularly effective embodiment, the disc member of each of the valves has a rhomboid-shaped median cross-sectional shape with the two obtuse angles rounded off and with each of the two opposite acute angles not greater than 60° (preferably from 30° to 55°).

When the said acute angles are greater than 60° the valve has a tendency to create vortices in the flow even in positions close to its maximum opening. A similar tendency is also shown when the acute angles are less than 30° and when the valve, so designed, is rotated through more than 30° from its position of maximum opening, even though, in practice, it is only rarely that the valve is rotated through such a large angle.

With regard to the fineness of adjustment, the disc member should preferably be so proportioned with regard to the flow cross-section of the duct as not to be able to close the duct completely. More precisely, in the position of maximum closure, the butterfly valve must preferably cut down the flow-section of the duct by at least 70% but not more than 90%. To the same end, it is advantageous for the dimension of the disc member of the valve measured along its axis of rotation, to be 60–80% of the corresponding dimension of the duct.

In an adaptor according to the invention constructed for the extrusion of streams of foam which are identical to each other (obviously with the use of identical extrusion heads) the ducts in the body of the adaptor are preferably identical to each other and the butterfly valves are also identical to each other and disposed in the respective ducts in positions identical to each other and adjacent the means for attachment of the respective extrusion heads. In a particularly convenient adaptor, the said ducts diverge from each other by identical amounts and are situated in radial planes uniformly spaced from each other about the axis of the body of the adaptor.

One embodiment of the invention is illustrated by way of example in the appended drawings, in which:

FIG. 1 is a side view of an extruder for synthetic thermoplastic foam provided with an adaptor according to the invention;

FIG. 2 is an axial cross-section of the adaptor taken on a radial plane containing one of the ducts;

FIG. 3 is an axial cross-sectional view of one of the butterfly valves;

FIG. 4 is a cross-section of the valve of FIG. 3 on a median plane perpendicular to the axis of the valve;

FIG. 5 is a side view of the disc of the butterfly valve;

FIG. 6 is a corresponding elevational view, and

FIG. 7 is a front view of the adaptor according to FIG. 2.

FIG. 1 illustrates a conventional extruder 10 for thermoplastic foam, having a barrel 12 fitted with a "FREON" injector 14. To the free end of the barrel is sealed, by means of clamping half-collars 16 (also see FIG. 2), an adaptor 18 for extruding three foam tubes 20, 20', 20" simultaneously and provided for this purpose with three extrusion heads 22, 22', 22" (see also FIG. 7) which are identical to each other.

The adaptor comprises a body constituted by a circular, cylindrical metal block 24 (FIG. 2) and a thick circular metal plate 26 sealingly bolted to the front face of the block 24 to form a cylindrical unit the axis of which is indicated by X. At its rear end, the block 24 has a flanged tail 28 for attachment to the barrel 12 of the extruder. In the operative position, the axis X of the adaptor is aligned with the axis X' of the barrel and sealing is ensured by means of a cylindrical sealing ring 30, the internal diameter of which is equal to the internal diameter of the barrel in this zone.

In the tail 28 is formed frontally a manifold chamber 32 of circular cross-section centred on the axis X. The manifold chamber 32 may have a domed form but is preferably of the double-cone shape illustrated, the base of which has the same diameter as the ring 30.

In FIG. 7 three radial planes, spaced from each other by 120° about the axis X, are denoted by P, P' and P''. In each of these planes, within the body of the adaptor, is formed a duct C, C', C'', respectively, of circular cross-section, the ducts being identical to each other. Each of these ducts is constituted by a rectilinear portion 34 (FIG. 2) formed in the block 24, which is of constant diameter and which branches from the manifold chamber 32 and diverges from the axis X, and by a portion 36 formed in the plate 26, which is of constant diameter, merges at inlet end with the portion 34 (FIG. 3) and extends parallel to the axis X. In the terminal part of the portion 36 adjacent the front face 26' of the adaptor is formed a screw-threaded seat 38 for the screwing-in of the respective extrusion head. The temperature of the flows of expansible material in the ducts C, C', C'' is kept under control by means of a cooling jacket 40 surrounding the block 24 and by means of a thermometric probe (not illustrated) screwed into a radial seat 42 formed in the block.

Respective identical butterfly valves V, V', V'' are located in identical positions (FIGS. 2 and 7) in the portions 36 of the ducts. Each of the valves includes an operating shaft 44 (FIG. 3) of circular cross-section lying in the respective plane P, P', P'' and arranged perpendicular to the axis X. Each shaft 44 passes diametrally through the portion 36 of the respective duct C, C', C'' and, within this portion, has a prismatic portion (quadrilateral in the case illustrated) 44' of reduced cross-section, forming a shoulder S on the shaft. A terminal part 44A of the shaft 44 is formed separately and has a circular cross-section to form a shoulder S' with respect to the prismatic portion 44'. The disc member of the valve is indicated by 46 and is constituted by a circular disc of diameter D (FIG. 5) the axis of rotation whereof is indicated by Xf and the transverse median plane whereof is indicated by Pm. The cross-section of the disc 46 in the plane Pm is a symmetrical rhomboid the two opposing obtuse angles M whereof are rounded and the two opposing acute angles N whereof have the values indicated previously, preferably 50°. On the axis Xf, the circumference of the disc 46 has two opposite flats 46' perpendicular to the axis Xf and a prismatic axial hole 48 which couples with the prismatic portion 44' of the shaft 44. The ends of the hole 48 are enlarged and of circular section to accomodate the shoulders S, S'. Both the diameter D of the disc and its dimension H along the axis Xf are smaller than the diameter D' of the portion 36 of the duct. Preferably the diameter D is 75–78% of D' while the dimension H is 80–90% of D. For example, the following values may be used:

D = 28 mm

D' = 32 mm the diameter of the shaft 44 (and of its terminal part 44A) being 12 mm. In this case, in the position of maximum closure, the valve cuts off about 81–82% of the flow-section of the portion 36 of the duct. It must be borne in mind that the "position of maximum closure" is a purely constructional detail in that, as will be seen below, this position is hardly ever reached during operation of the adaptor.

Turning to FIG. 3, the shaft 60 is surrounded by a packing 50 compressed by a stuffing-box sleeve 52 which is screwed into a radial seat in the plate 26 and has a hollow hexagonal head 52'. In the zone of the cavity in the head 52', the shaft 44 has a preterminal, cylindrical portion 44B and a prismatic end 44C, the portion 44B being of a reduced diameter to form on the shaft a shoulder S''. A locking sleeve 54 with a hexagonal head 54' is screwable into the head 52'. The internal diameter of the locking sleeve 54 corresponds to the outer diameter of the pre-terminal portion 44B whereby, on screwing, the locking screw presses axially against the shoulder S'' and this pressure is counteracted by the terminal part 44A of the shaft until the valve is locked. Under these conditions the disc member 46 of the valve is centred in the portion 36 of the duct in the direction of the axis Xf, that is, the median plane Pm of the disc member coincides with the axis Y of the said portion 36 (FIG. 3). Finally, a line or arrow (not illustrated) is preferably incised in the front face 44C' of the prismatic end 44C of the shaft 44 in the plane of the disc member 46 to indicate the angular position of the disc member about its axis of rotation Xf.

The adaptor as described above operates as follows. Initially, all the valves are brought to the position of minimum closure, illustrated in FIG. 4, and the extrusion process is started. The flow of softened, expansible, plastics material reaches the manifold 32 (FIG. 2) and divides into three partial flows flowing along the ducts C, C' and C''. Owing to the fact that the ducts, the valves and the extrusion heads are identical, presumably the partial flows will be identical to each other, giving rise to identical foam tubes 20, 20', 20'' (FIG. 1). In practice this is rarely true, especially in the case of low density foams, even when, as is desirable, the temperature of the hot mass which leaves the extruder and which passes through the adaptor is very close to the incipient solidification point. Typically, the extrusion rate of one of the tubes 20, 20', 20'' is less than that of the other two which in their turn are different from each other. As stated above, this circumstance is due to different degrees of expansion and results in the respective foams having different densities and in the extruded tubes having different diameters. For example, if the flow through the valve V has the lowest rate, the valves V' and V'' must be adjusted to reduce the rates of their respective flows, with corresponding intensification of the flow through the valve V, until the three flows are substantially equal. This can be effected in various ways. For example, one may start by adjusting the valve traversed by the fastest flow, for example V'. For this purpose the locking sleeve 54 of the valve V''' is unscrewed by a fraction of a turn and the disc member 46 is rotated through a few degrees by operation of the prismatic end 44C of the shaft 44 with a key. This results in the flow through the valve V" being reduced while, consequently, the flows through the valves V and V' increase. The valve V" is adjusted so that its flow is intermediate the flows through V and V', after which the sleeve 54 is screwed to lock the shaft 44 in its adjusted angular position. The angular position of the valve V' is then adjusted. By this adjustment the flow through V' is reduced while the flows through V and V" are increased, but the flow through V increases faster than that through V" (for this circumstance it is necessary to take the previous adjustment of the valve V" into account). Generally, after the adjustment of the valve V' described above the three flows are substantially identical. If necessary, the adjustment may be perfected by proceeding according to the criteria described above, that is, starting from the fastest flow.

But what most distinguishes the adjustment system according to the invention, and which is different from other means, is that the butterfly valves described above allow very precise adjustment to be effected over a wide range without introducing intolerable disturbances into the respective flows such as to produce perceptible mutual differences in the densities of the products 20, 20', 20" or local variations in densities of the individual products. The angle necessary for the adjustment is generally less than 30° in either sense about the axis Xf and is only rarely as high as 45°. The adjustment sensitivity increases with diminution of the ratio H/D (FIG. 5) but with ratios below about 50/100, large adjustment angles would be necessary which would result in the risk of inducing unacceptable vortical motion in the flow of material with resulting considerable variations in the degree of expansion of the foam. With the construction described above, by way of example, a fineness of adjustment may be achieved which, expressed as the maximum density variation of the extruded foam, is less than 5%.

I claim:

1. A synthetic thermoplastic foam extruder comprising a barrel, injection means for injecting a foaming agent into said barrel and an adapter for extruding a plurality of streams of thermoplastic synthetic foam simultaneously from said extruder, comprising: a body having at one end means for attaching said body to said barrel of said extruder in axial alignment therewith; a manifold chamber formed frontally in said one end to receive the thermoplastic mass from said barrel; a plurality of ducts formed in said body, radiating from said manifold chamber and opening on the opposite of said body, each of said ducts terminating with attachment means for a respective extrusion head; a butterfly valve in each of said ducts and means for locking each of the valves individually in a desired angular position, each butterfly valve being comprised of a disc member having a median transverse section in the form of a rhomboid with the two opposing obtuse angles rounded off and with the two opposing acute angles being not greater than 60° and having a dimension measured along the axis of rotation which is 60–80 percent of the corresponding dimension of the duct whereby in the position of maximum closure said butterfly valve cuts off at least 70 percent but not more than 90 percent of the flow cross section of the respective duct.

2. A synthetic thermoplastic foam extruder as set forth in claim 1 wherein said ducts are identical to each other and in which said butterfly valves are identical to each other and disposed in the respective ducts in identical positions adjacent the attachment means for the respective extrusion heads.

3. A synthetic thermoplastic foam extruder as set forth in claim 2 wherein said ducts are diverge from each other and are situated in radial planes uniformly angularly spaced from each other about the axis of the body of the adapter.

* * * * *